(12) United States Patent
Lan et al.

(10) Patent No.: US 12,316,149 B2
(45) Date of Patent: May 27, 2025

(54) CHARGING DEVICE WITH MOVABLE BOARD

(71) Applicant: Anker Innovations Technology Co., Ltd., Changsha (CN)

(72) Inventors: Dong Lan, Shenzhen (CN); Xinqing Xiong, Shenzhen (CN)

(73) Assignee: Anker Innovations Technology Co., Ltd., Changsha (CN)

( * ) Notice: Subject to any disclaimer, the term of this patent is extended or adjusted under 35 U.S.C. 154(b) by 0 days.

(21) Appl. No.: 18/814,964

(22) Filed: Aug. 26, 2024

(65) Prior Publication Data
US 2024/0421620 A1    Dec. 19, 2024

Related U.S. Application Data

(63) Continuation of application No. PCT/CN2023/080587, filed on Mar. 9, 2023.

(30) Foreign Application Priority Data

Mar. 10, 2022  (CN) .......................... 202220517686.1

(51) Int. Cl.
*H01M 10/46*  (2006.01)
*H02J 7/00*  (2006.01)

(52) U.S. Cl.
CPC ........ *H02J 7/0044* (2013.01); *H02J 7/00047* (2020.01); *H02J 7/0013* (2013.01); *H02J 2207/10* (2020.01)

(58) Field of Classification Search
CPC ...... H02J 7/0044; H02J 7/0042; H02J 7/0013; H02J 7/00047; H02J 50/005; H02J 2207/10

USPC ................. 320/107, 108, 114, 115, 116, 138
See application file for complete search history.

(56) References Cited

U.S. PATENT DOCUMENTS

| 11,005,279 B2 * | 5/2021 | Miller ................... H02J 7/0042 |
| 2018/0102654 A1 * | 4/2018 | Miller ................... H02J 7/0042 |

FOREIGN PATENT DOCUMENTS

| CN | 111478393 A | 7/2020 |
| CN | 112234664 A | 1/2021 |
| CN | 213279218 U | 5/2021 |
| CN | 215267731 U | 12/2021 |

OTHER PUBLICATIONS

Machine translation of CN-111478393-A (Jul. 31, 2020) (Year: 2020).*
Jun. 13, 2023—(CN)—International Search Report of PCT/CN2023/080587.

* cited by examiner

*Primary Examiner* — Edward Tso
(74) *Attorney, Agent, or Firm* — Banner & Witcoff, Ltd.

(57) ABSTRACT

The present disclosure relates to the technical field of charging equipment and discloses a charging device. The charging device includes a housing, a movable board, a charging circuitry, and a power interface. The housing comprises a cavity, a body, and a flip cover pivotably connected to the body. The charging circuitry, is located on the movable board, and the movable board is configured to be extendable or retractable relative to the cavity. The power interface is electrically connected to an external power supply and configured to transmit power supplied by the external power supply to the charging circuitry.

20 Claims, 4 Drawing Sheets

CHARGING DEVICE WITH MOVABLE BOARD

CROSS-REFERENCE TO RELATED APPLICATIONS

The present application is a continuation of and claims priority to PCT/CN2023/080587, filed on Mar. 9, 2023, which claims priority to Chinese patent application No. 202220517686.1 filed on Mar. 10, 2022 before the China National Intellectual Property Administration of the People's Republic of China, each of which is incorporated herein by reference in its entirety.

TECHNICAL FIELD

The present disclosure relates to the technical field of charging equipment, particularly to a charging device.

BACKGROUND ART

At present, charging equipment in the market can charge electronic devices such as True Wireless Stereo (TWS) earphones, smartphones, and smartwatches. However, due to unreasonable structural design, the current charging equipment is not compact enough and occupies a large space, and is inconvenient for a user to carry around and use.

SUMMARY

In view of the above, a main technical problem solved by the disclosure is to provide a charging device which occupies a small space and is convenient for a user to carry around and use.

In order to solve the above technical problem, a technical solution adopted by the disclosure is to provide a charging device. The charging device comprises a housing assembly, a first charging assembly, and a power interface. The housing assembly has an accommodating chamber inside (e.g., a cavity) and comprises a housing body and a flip cover rotatably (e.g., pivotably) provided on the housing body (e.g., connected to the housing body), and a surface of the flip cover away from the housing body is a first bearing surface. The first charging assembly is provided on the housing assembly and includes a moving member (e.g., a movable board) and a charging element (e.g., charging circuitry) located on the moving member, the moving member being movably provided in the accommodating chamber and being extendable or retractable relative to the accommodating chamber. The power interface is electrically connected to an external power supply to transmit power supplied by the external power supply to the charging element.

In an example of the disclosure, the moving member includes a moving member body and a first abutting portion protruding from the moving member body, and the charging element is located on the moving member body. The housing assembly further includes an opening and a second abutting portion, the opening communicates with the accommodating chamber, the second abutting portion is adjacent to the opening, wherein when the moving member extends from the opening relative to the accommodating chamber, the first abutting portion abuts against the second abutting portion to limit separation of the moving member from the accommodating chamber.

In an example of the disclosure, the moving member includes a moving member body and a first abutting portion enclosing an outer periphery of the moving member body, and each of the moving member body and the first abutting portion includes an upper housing and a lower housing.

In an example of the disclosure, the first charging assembly further includes an elastic member (e.g., a spring), by which the moving member is connected to the housing assembly, and the elastic member is configured to drive the moving member to extend relative to the accommodating chamber.

In an example of the disclosure, the first charging assembly further includes a limit rod; and one end of the limit rod is fixed to the housing assembly and the limit rod is threaded through the moving member, the moving member is capable of moving along the limit rod, and the elastic member is sleeved around an outer periphery of the limit rod and is sandwiched between the moving member and the housing assembly.

In an example of the disclosure, the first charging assembly further includes a press-type lock located on the moving member and a fastener located in the accommodating chamber; and after the moving member retracts, the press-type lock is capable of fitting the fastener to lock the moving member and releasing the lock of the fastener under pressure to allow the moving member to extend out.

In an example of the disclosure, the moving member is provided with a slider, a slide rail is provided in the accommodating chamber, the slider is slidably connected to the slide rail and is capable of sliding along the slide rail as the moving member moves, and the slide rail is configured to guide the moving member to move.

In an example of the disclosure, the charging device further includes a second charging assembly which is provided on the flip cover and is configured to charge an electronic device borne on the first bearing surface.

In an example of the disclosure, the housing assembly further includes a damping rotating shaft, and the flip cover is rotatably provided on the housing body through the damping rotating shaft, wherein the damping rotating shaft is configured to provide a damping force to maintain a relative position between the flip cover and the housing body after the flip cover rotates relative to the housing body.

In an example of the disclosure, the housing assembly includes the housing body and the flip cover, the first charging assembly is provided on the housing body, the flip cover is rotatably provided on the housing body, and a surface of the housing body facing the flip cover is a second bearing surface, and the charging device further includes a third charging assembly which is provided on the housing body and is closer to the second bearing surface than the first charging assembly, wherein the third charging assembly is configured to charge an electronic device borne on the second bearing surface.

In an example of the disclosure, the charging device further includes a circuit board, and the circuit board is provided in the housing assembly and is electrically connected to each of the charging element and the power interface to transmit power supplied by the external power supply to the charging element through the circuit board.

In an example of the disclosure, the charging device further includes a power supply; and the power supply is provided inside the housing assembly and supplies power to the first charging assembly.

A beneficial effect of the disclosure is that the disclosure provides a charging device different from the related art. A first charging assembly of the charging device includes a charging element and a moving member. The charging element is located on the moving member, and the moving member is movably provided in the accommodating chamber of the housing assembly. The moving member is extendable or retractable relative to the accommodating chamber. The charging element can charge an electronic device when the moving member extends out, and the moving member can retract into the accommodating chamber after completion of charging. In other words, the moving member according to the disclosure can retract into the accommodating chamber to reduce an overall volume of the charging device, that is, the charging device occupies a small space and is convenient for a user to carry around. Further, even if the moving member extends out, the charging device according to the disclosure still has a small volume and is convenient for the user to use.

BRIEF DESCRIPTION OF THE DRAWINGS

The accompanying drawings, which are incorporated in and constitute a part of this specification, illustrate examples consistent with the disclosure and, together with the description, serve to explain the principles of the disclosure. In addition, these drawings and written description are not intended to limit the scope of the concept of the disclosure in any way, but to illustrate the concept of the disclosure for those skilled in the art by referring to specific examples.

DETAILED DESCRIPTION

In order to make the object, technical solutions and advantages of the disclosure clearer, the technical solutions in the examples of the disclosure will be clearly and completely described below with reference to the examples of the disclosure. Obviously, the described examples are part of the examples of the disclosure, but not all of the examples. All other examples, which can be derived by a person skilled in the art from the examples given herein without making any creative effort, shall fall within the protection scope of the disclosure. The examples described below and features in the examples may be combined with each other without conflict.

In order to solve the technical problem of equipment devices occupying a large space in the related art, an example of the disclosure provides a charging device. The charging device includes a housing assembly having an accommodating chamber inside. The charging device further includes a first charging assembly, which includes a charging element and a moving member. The charging element is located on the moving member, and the moving member is movably provided in the accommodating chamber, in which the moving member is extendable or retractable relative to the accommodating chamber. These will be described in detail below.

Figure 1:
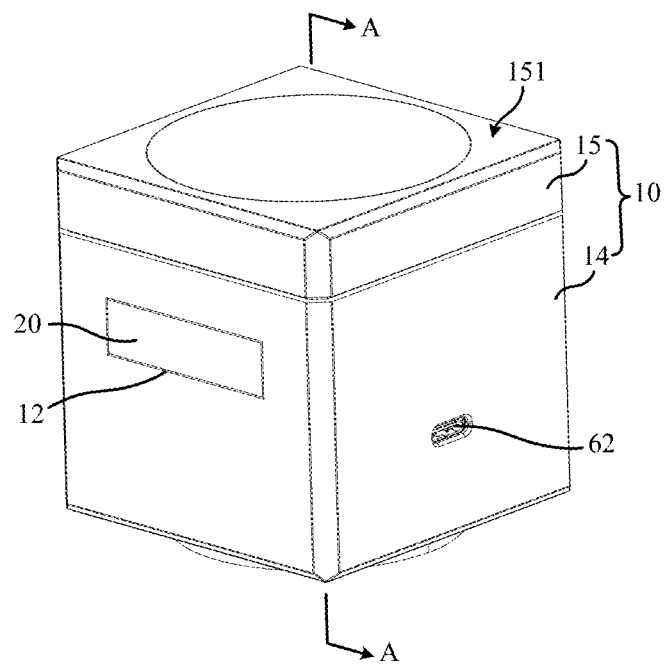
FIG. 1 is a structural diagram of a charging device according to an example of the disclosure.
Figure 2:
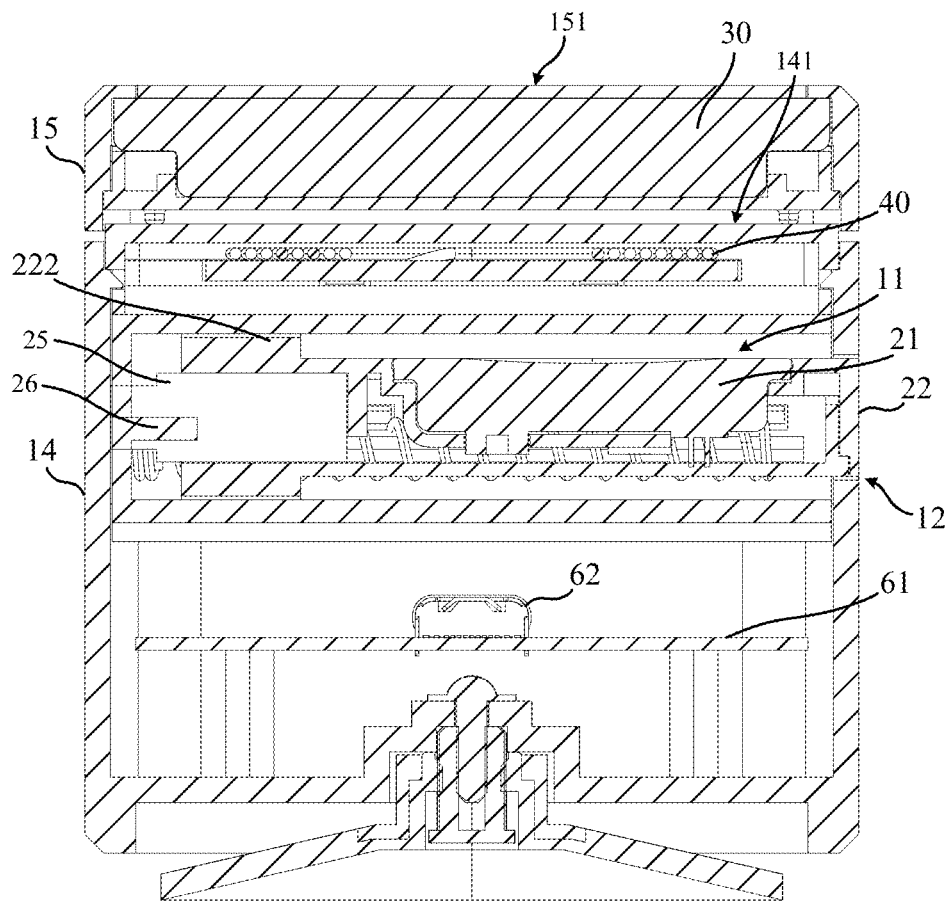
FIG. 2 is a structural diagram of a cross section of the charging device in an A-A direction as shown in FIG. 1.
Figure 3:
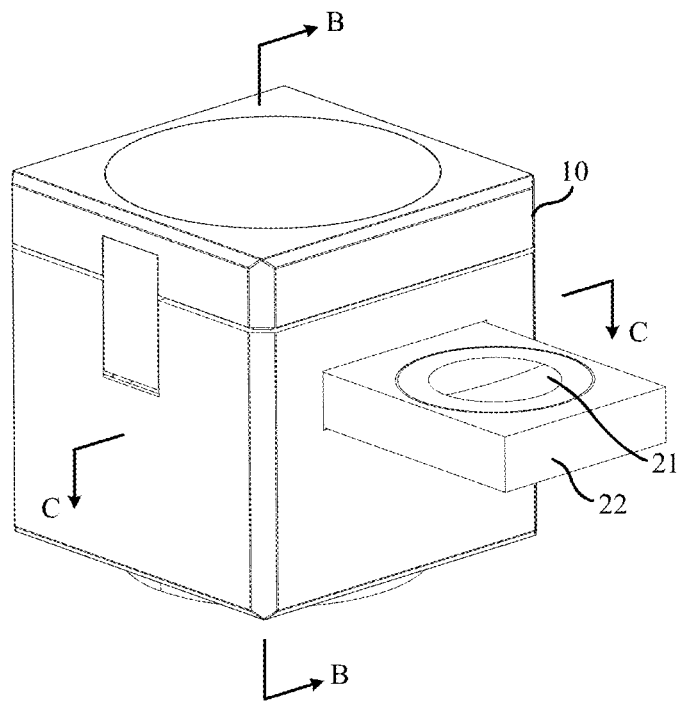
FIG. 3 is a structural diagram of the charging device shown in FIG. 1 in another state.

Referring to FIGS. 1 to 3, FIG. 1 is a structural diagram of a charging device according to an example of the disclosure, FIG. 2 is a structural diagram of a cross section of the charging device in an A-A direction as shown in FIG. 1, and FIG. 3 is a structural diagram of the charging device shown in FIG. 1 in another state.

In an example, the charging device includes a housing assembly 10. As a basic carrier of the charging device, the housing assembly 10 carries and protects other parts of the charging device. The housing assembly 10 has an accommodating chamber 11 (e.g., housing, cavity) inside.

The charging device further includes a first charging assembly 20. The first charging assembly 20 includes a charging element 21 (e.g., a charging circuitry and/or a controller circuitry) and a moving member 22 (e.g., a movable board such as a retractable board or plate). The charging element 21 is located on the moving member 22, and the moving member 22 is movably provided in the accommodating chamber 11. The moving member 22 is extendable or retractable relative to the accommodating chamber 11. When the moving member 22 extends relative to the accommodating chamber 11, the charging element 21 extends to the outside of the housing assembly 10 along with the moving member 22. At this time, the charging element 21 can charge an electronic device as shown in FIG. 3. After the charging is completed, the moving member 22 can retract relative to the accommodating chamber 11, and the charging element 21 retracts into the accommodating chamber 11 along with the moving member 22 as shown in FIGS. 1 and 2.

As can be seen from the above, the moving member 22 according to the present example can retract into the accommodating chamber 11, so that an overall volume of the charging device is reduced, that is, the charging device occupies a small space, and is convenient for a user to carry around. Further, even if the moving member 22 extends out, the charging device according to the present example still has a small volume to be convenient for the user to use.

Additionally or alternatively, the charging element 21 can be a wireless charging element, and charges an electronic device such as a smartwatch through wireless charging. The charging element 21 can support a MagSafe charging connection technology and the like. An electronic device having a magnetic attraction function can be automatically attracted on the charging element 21 by approaching the charging element 21 and establish an electrical connection for charging.

Figure 4:
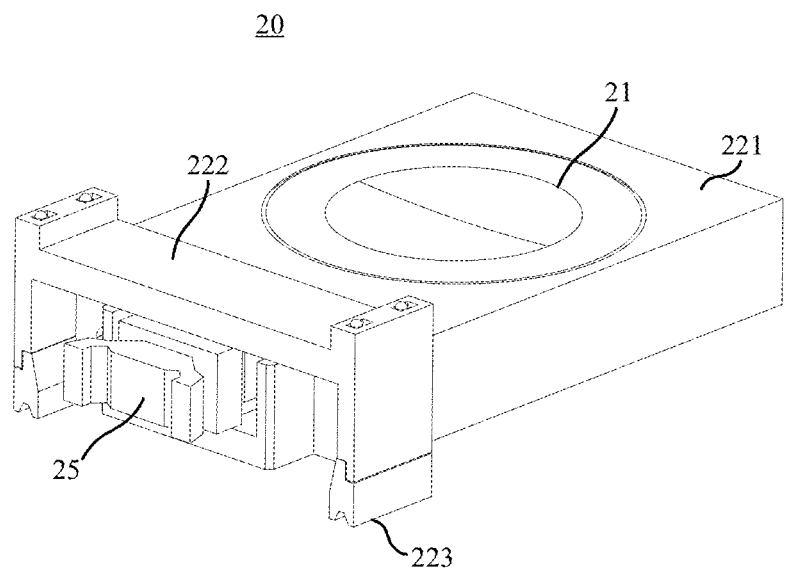
FIG. 4 is a structural diagram of a moving member (e.g., movable board) according to an example of the disclosure.

Referring to FIG. 4, FIG. 4 is a structural diagram of the moving member according to an example of the disclosure.

In an example, the moving member 22 includes a moving member body 221 (e.g., board) and a first abutting portion 222 (e.g., a first connection part, a first connection interface, a first connection point) protruding from the moving member body 221. The charging element 21 is located on the moving member body 221.

Figure 5:
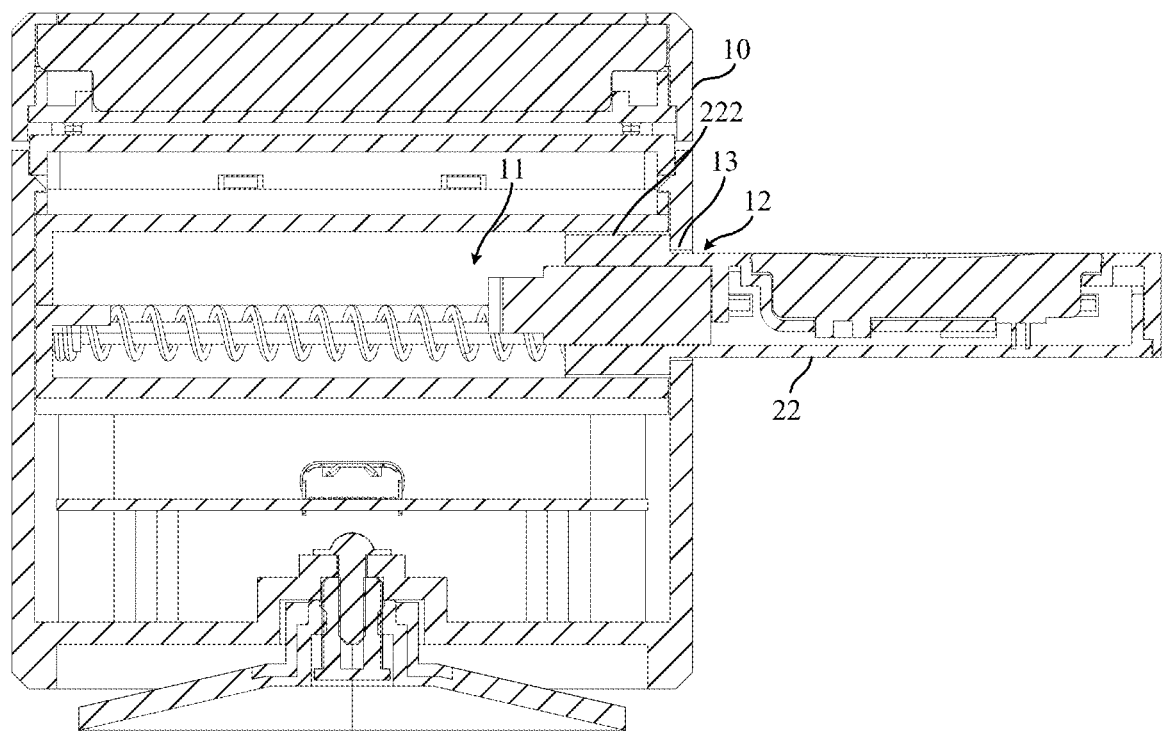
FIG. 5 is a structural diagram of a cross section of the charging device in a B-B direction as shown in FIG. 3.

Referring to FIG. 5, FIG. 5 is a structural diagram of a cross section of the charging device in a B-B direction as shown in FIG. 3.

The housing assembly 10 further has an opening 12 and a second abutting portion 13. The opening 12 is connected to the accommodating chamber 11, e.g., the accommodating chamber 11 is connected to the outside of the housing assembly 10 via the opening 12, and the moving member 22 extends from the accommodating chamber 11 via the opening 12 and retracts into the accommodating chamber 11 via the opening 12. The second abutting portion 13 is adjacent to the opening 12. In other words, the second abutting portion 13 is in the housing assembly 10 around the opening 12.

When the moving member 22 extends from the opening 12 relative to the accommodating chamber 11, the first abutting portion 222 abuts against the second abutting portion 13 to limit further extension of the moving member 22 relative to the accommodating chamber 11 and to avoid separation between the moving member 22 and the accommodating chamber 11, to prevent the moving member 22 from completely detaching from the accommodating chamber 11. Thus, when the moving member 22 extends relative to the accommodating chamber 11, the first abutting portion 222 abuts against (e.g., contacts) the second abutting portion 13, so that the moving member 22 can reliably bear an electronic device, and the charging element 21 charges the electronic device.

For example, the charging element 21 can be used for charging an electronic device such as a smartwatch. Specifically, a dial plate of the smartwatch is placed on the moving member 22 and is opposite to (e.g., in contact with) the charging element 21. At this time, the moving member 22 bears the smartwatch, and the charging element 21 can charge the smartwatch.

As shown in FIG. 4, the first abutting portion 222 encloses the outer periphery of the moving member body 221. The moving member 22 may include an upper housing and a lower housing. For example, each of the moving member body 221 and the first abutting portion 222 includes an upper housing and a lower housing to facilitate assembly of the charging element 21 to the moving member 22.

Figure 6:
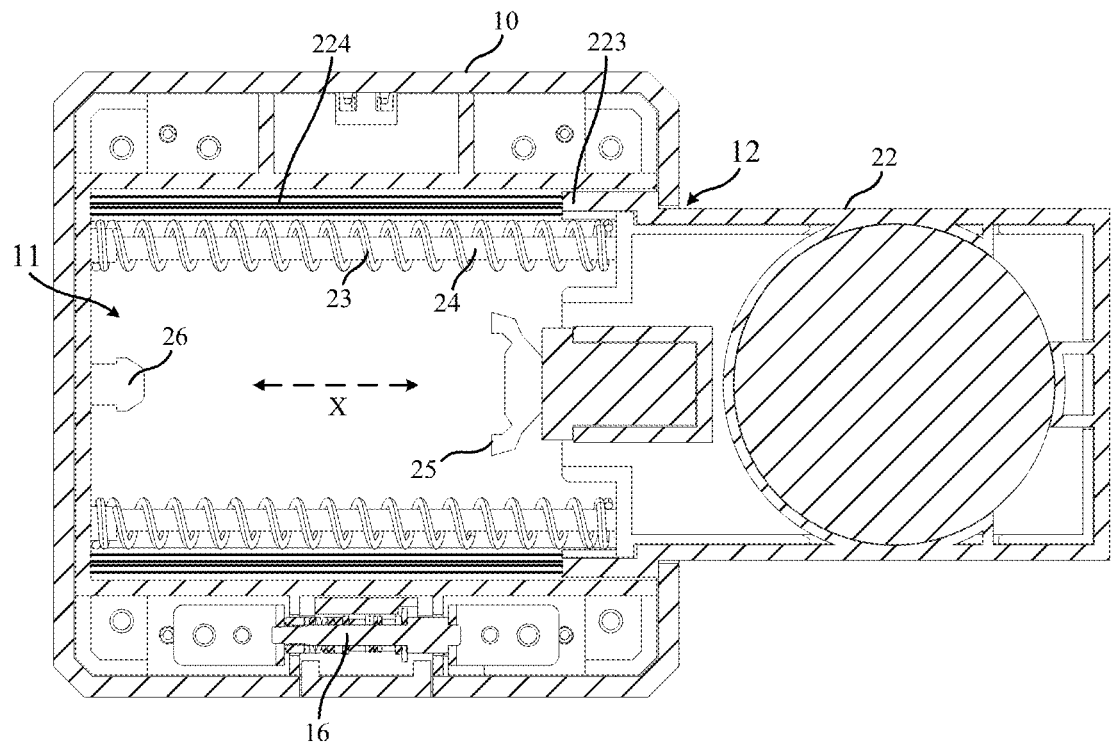
FIG. 6 is a structural diagram of a cross section of the charging device in a C-C direction as shown in FIG. 3.

Referring to FIG. 6, FIG. 6 is a structural diagram of a cross section of the charging device in a C-C direction as shown in FIG. 3.

In an example, the first charging assembly 20 further includes an elastic member 23. The moving member 22 is connected to the housing assembly 10 through the elastic member 23 which is configured to make the moving member 22 tend to extend relative to the accommodating chamber 11. For example, the elastic member 23 is configured to drive the moving member 22 to extend relative to the accommodating chamber 11. In other words, an elastic recovery force provided by the elastic member 23 drives the moving member 22 to extend from the accommodating chamber 11, and a user can conveniently eject the moving member 22 to charge the electronic device using the charging element 21, which is convenient for the user to use the charging device according to the present example.

For the first abutting portion 222 and the second abutting portion 13 described in the above examples, the elastic member 23 according to the present example drives the moving member 22 to extend from the accommodating chamber 11 until the first abutting portion 222 on the moving member 22 abuts against the second abutting portion 13 on the housing assembly 10, which limits further extension of the moving member 22 relative to the accommodating chamber 11. At this time, the elastic recovery force provided by the elastic member 23 can maintain the state of the moving member 22 extending from the accommodating chamber 11 (e.g., the moving member 22 is in the accommodating chamber 11 in a first state, and the moving member 22 is not in the accommodating chamber 11 in a second state), which ensures that the moving member 22 reliably bears the electronic device during the charging process and reduces a risk that the moving member 22 retracts into the accommodating chamber 11 by mistake due to an external force.

Further, the first charging assembly 20 further includes a limit rod 24. An end of the limit rod 24 is fixed to the housing assembly 10. Specifically, the end of the limit rod 24 is fixed to a surface of the housing assembly 10 facing the opening 12. Moreover, the limit rod 24 is threaded through the moving member 22 and extends along a movement direction of the moving member 22 (as shown by an arrow X in FIG. 6, the same below), and the moving member 22 can move along the limit rod 24. The elastic member 23 is sleeved around the outer periphery of the limit rod 24 and is sandwiched between the moving member 22 and the housing assembly 10. The limit rod 24 can limit the position of the elastic member 23.

For example, the first charging assembly 20 includes two sets of elastic members 23 and limit rods 24 which are respectively provided on two opposite sides of the accommodating chamber 11. One set of the elastic member 23 and the limit rod 24 is located on one side of the accommodating chamber 11, and the other set of the elastic member 23 and the limit rod 24 is located on the other opposite side of the accommodating chamber 11. The elastic member 23 may be a spring or the like, which is not limited herein.

Referring to FIGS. 4 and 6, in an example, the moving member 22 is provided with a slider 223, a slide rail 224 is provided in the accommodating chamber 11, and the slider 223 is slidably connected to the slide rail 224. The slide rail 224 extends along the movement direction of the moving member 22, and the slider 223 can slide along the slide rail 224 as the moving member 22 moves. The slide rail 224 is configured to guide the moving member 22 to move.

Referring to FIGS. 2 and 6, in an example, the first charging assembly 20 further includes a press-type lock 25 (e.g., a push-type lock) and a fastener 26 (e.g., a buckle). The press-type lock 25 is located on the moving member 22. Further, the press-type lock 25 is located in a space surrounded by the moving member body 221 described above, and the first abutting portion 222 encloses the outer periphery of the press-type lock 25. The fastener 26 is located in the accommodating chamber 11.

The press-type lock 25 adopts a self-locking design. When the press-type lock 25 presses against the fastener 26, the press-type lock 25 can fit and lock the fastener 26 (e.g., the press-type lock 25 can be locked with the fastener), as shown in FIG. 2; and when the press-type lock 25 presses against the fastener 26 again, the press-type lock 25 can release the fastener 26 to release the lock, as shown in FIG. 6. Specifically, after the moving member 22 retracts, the press-type lock 25 presses against the fastener 26 and can fit the fastener 26 to lock the moving member 22 (e.g., the press-type lock is configured to lock the moving member 22 with the fastener 26). The press-type lock 25 presses against the fastener 26 again and can release the lock of the fastener 26 under pressure to allow the moving member 22 to extend out.

For example, before the user uses the first charging assembly 20, the moving member 22 retracts into the accommodating chamber 11, and at this time, the press-type lock 25 fits the fastener 26 to lock the moving member 22. When the user needs to use the first charging assembly 20 to charge the electronic device, the user presses the moving member 22 to cause the press-type lock 25 to press against the fastener 26. At this time, the press-type lock 25 releases the lock of the fastener 26, and the moving member 22 extends from the accommodating chamber 11 under the drive of the elastic member 23 to allow the user to charge the electronic device with the first charging assembly 20, as shown in FIG. 6. After the charging is completed, the user presses the moving member 22 back into the accommodating chamber 11. At this time, the press-type lock 25 presses against the fastener 26 again and fits the fastener 26 again to lock the moving member 22, as shown in FIG. 2.

It should be noted that the self-locking design of the press-type lock 25 may fall into the scope of understanding of those skilled in the art, and is not repeated here.

Figure 7:
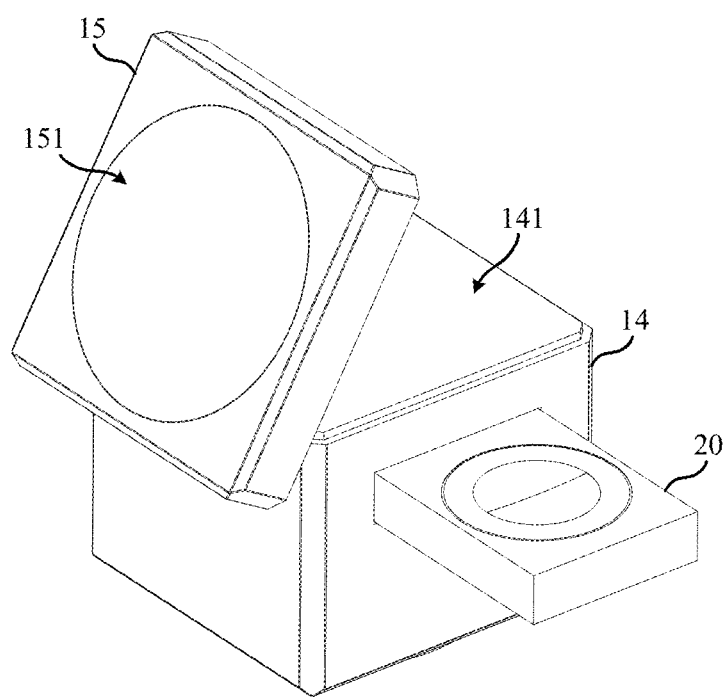
FIG. 7 is a structural diagram of the charging device shown in FIG. 1 in another state.

Referring to FIGS. 1, 2, and 7, FIG. 7 is a structural diagram of the charging device shown in FIG. 1 in another state.

In an example, the housing assembly 10 includes a housing body 14 and a flip cover 15 rotatably (e.g., pivotably) provided on (e.g., coupled to) the housing body 14. The first charging assembly 20 described above is provided on the housing body 14, and the corresponding accommodating chamber 11 and opening 12 are also provided on the housing body 14.

Further, as shown in FIG. 6, the housing assembly 10 further includes a damping rotating shaft 16, by which the flip cover 15 is rotatably provided on the housing body 14. The damping rotating shaft 16 provides a damping force to maintain a relative position between the flip cover 15 and the housing body 14 after the flip cover 15 rotates relative to the housing body 14.

It should be noted that the specific design of the damping rotating shaft 16 may fall into the understanding of those skilled in the art, and is not repeated here.

In an example, the charging device further includes a second charging assembly 30 (e.g., a second charging circuitry and/or a second controller circuitry). The first charging assembly 20 and the second charging assembly 30 are respectively used for charging different electronic devices. Specifically, a surface of the flip cover 15 away from the housing body 14 is a first bearing surface 151. The second charging assembly 30 is provided on the flip cover 15, and is used for charging an electronic device borne on the first bearing surface 151.

Alternatively, the second charging element 30 may also be a wireless charging element, and charges an electronic device such as a smartphone by wireless charging. The second charging element 30 can also support a MagSafe charging connection technology and the like, and an electronic device having a magnetic attraction function can automatically adhere to the first bearing surface 151 by approaching the first bearing surface 151 on the flip cover 15 and establish an electrical connection with the second charging element 21 for charging.

It should be noted that the flip cover 15 can rotate relative to the housing body 14. Therefore, the user can flip the flip cover 15 up, and the first bearing surface 151 on the flip cover 15 forms a certain angle with a horizontal plane (as shown in FIG. 7). Then, the user can cause an electronic device such as a smartphone to be attracted on the first bearing surface 151, so that the smartphone is placed at a certain angle. At this time, the user can not only conveniently receive display contents presented on the smartphone, but also charge the smartphone at the same time.

In an example, a surface of the housing body 14 facing the flip cover 15 is a second bearing surface 141. The charging device further includes a third charging assembly 40 (e.g., a third charging circuitry and/or a third controller circuitry) which is provided on the housing body 14 and is closer to the second bearing surface 141 than the first charging assembly 20. The third charging assembly 40 is used for charging an electronic device borne on the second bearing surface 141.

When the flip cover 15 covers the housing body 14, the flip cover 15 is stacked on the second bearing surface 141 of the housing body 14. When the flip cover 15 rotates relative to the housing body 14 and is flipped up, the second bearing surface 141 of the housing body 14 is exposed by flipping up the flip cover 15, thereby allowing the electronic device to be placed on the second bearing surface 141 and charged using the third charging assembly 40.

Alternatively, the third charging element 40 may also be a wireless charging element, and charges an electronic device such as a TWS earphone by wireless charging. The third charging element 40 can also support a MagSafe charging connection technology and the like. An electronic device having a magnetic attraction function can automatically adhere to the second bearing surface 141 by approaching the second bearing surface 141 on the housing body 14 and establish an electrical connection with the third charging element 21 for charging.

It should be noted that the first charging assembly 20, the second charging assembly 30, and the third charging assembly 40 are respectively used for charging different electronic devices. In other words, the first charging assembly 20, the second charging assembly 30, and the third charging assembly 40 according to the present example can charge three electronic devices at the same time. For example, as shown in FIG. 7, the user can place a smartwatch on the first charging assembly 20 for charging by ejecting the moving member 22 of the first charging assembly 20 from the housing assembly 10; the user can place a smartphone on the first bearing surface 151 of the flip cover 15 by flipping up the flip cover 15 and use the second charging assembly 30 to charge the smartphone; after the flip cover 15 is flipped up, the second bearing surface 141 of the housing body 14 can be exposed, and an earphone (such as a TWS earphone) can be placed on the second bearing surface 141 of the housing body 14 and charged with the third charging assembly 40. The first charging assembly 20, the second charging assembly 30, and the third charging assembly 40 have a compact structure, so that an overall volume of the charging device is small and the space occupied by the charging device is small. That is, the charging device according to the present example can achieve a three-in-one charging module design for a smartwatch, a smartphone, and an earphone with a small volume.

Referring to FIGS. 1 and 2, in an example, the charging device further includes a circuit board 61 and a power interface 62. The circuit board 61 is provided in the housing assembly 10, and is electrically connected to the power interface 62. Moreover, the first charging assembly 20, the second charging assembly 30, and the third charging assembly 40 described above are all electrically connected to the circuit board 61. The power interface 62 is also used for electrical connection to an external power supply to transmit power supplied by the external power supply to the charging element 21 through the circuit board 61.

In other words, the charging device according to the present example may not be provided with a power supply (e.g., an internal power supply). The first charging assembly 20, the second charging assembly 30, and the third charging assembly 40 may be all electrically connected to the external power supply through the circuit board 61 and the power interface 62 to charge the electronic device with power supplied by the external power supply. In the charging device according to the present example, a space occupied by the power supply is saved, the volume of the charging device is further reduced, and the space occupied by the charging device is reduced, thereby further facilitating the user to carry around and use the charging device.

In other examples of the disclosure, a power supply may be provided inside the housing assembly 10 of the charging device and supplies power to the first charging assembly 20, the second charging assembly 30, and the third charging assembly 40 to charge the electronic device, which is not limited herein.

In summary, according to the charging device of the disclosure, the moving member can retract into the accommodating chamber, so that the overall volume of the charging device is reduced. The charging device has a small volume and occupies a small space, which makes it convenient for the user to carry around. Further, even if the moving member extends out, the charging device according to the disclosure also has a small volume to be convenient for the user to use.

Moreover, with a small volume, the charging device according to the disclosure can achieve a three-in-one charging module design for a smartwatch, a smartphone, and an earphone. The first charging assembly, the second charging assembly, and the third charging assembly in the charging device have a novel structure, and an outstanding technological sense and playability.

In addition, in the disclosure, unless otherwise specified and limited, the terms such as "connect" and "stack" should be interpreted in the broadest manner, for example, it may be fixedly connected, detachably connected, or integrally formed, or may be directly connected or indirectly connected through an intermediate medium, or may be an internal connection of two elements or an interaction relationship between two elements. The specific meanings of the above terms in the disclosure can be understood by those skilled in the art according to specific situations.

At last, it should be noted that: the above examples are only used to describe rather than limiting the technical solutions of the disclosure; although the disclosure is described in detail with reference to the foregoing examples, a person skilled in the art in the art should understand that modifications can still be made to the technical solutions described in the foregoing examples, or equivalent substitutions can be made to part or all of the technical features; these modifications or substitutions do not cause the spirit of the corresponding technical solutions to depart from the scope of the technical solutions of the examples of the disclosure.

What is claimed is:

1. A charging device comprising:
    a housing comprising a cavity, a body, and a flip cover, wherein the flip cover is pivotably connected to the body;
    a movable board comprising charging circuitry, wherein the movable board is configured to slide relative to the cavity; and
    a power interface electrically connected to an external power supply and configured to transmit power supplied by the external power supply to the charging circuitry.

2. The charging device according to claim 1, wherein:
    the movable board comprises a movable body and a first abutting portion protruding from the movable body, and the charging circuitry is located on the movable body,
    the housing further comprises an opening and a second abutting portion,
    the opening is connected to the cavity,
    the second abutting portion is adjacent to the opening, and when the movable board extends from the opening relative to the cavity, the first abutting portion abuts against the second abutting portion to limit separation of the movable board from the cavity.

3. The charging device according to claim 1, wherein:
    the movable board comprises a movable body and a first abutting portion enclosing an outer periphery of the movable body, and
    each of the movable body and the first abutting portion comprises an upper housing and a lower housing.

4. The charging device according to claim 1, further comprising:
    a spring connected to the movable board and the housing, wherein the spring is configured to drive the movable board to extend relative to the cavity.

5. The charging device according to claim 4, further comprising:
    a limit rod, wherein:
    one end of the limit rod is fixed to the housing,
    the limit rod is threaded through the movable board, and
    the spring is sleeved around an outer periphery of the limit rod.

6. The charging device according to claim 1, further comprising:
    a lock located on the movable board; and
    a fastener located in the cavity, wherein the lock is configured to lock the movable board with the fastener.

7. The charging device according to claim 1, wherein:
    the movable board comprises a slider,
    a slide rail is provided in the cavity,
    the slider is slidably connected to the slide rail and is configured to slide along the slide rail as the movable board moves, and
    the slide rail is configured to guide the movable board to slide.

8. The charging device according to claim 1, further comprising a second charging circuitry located on the flip cover and configured to charge an electronic device on a surface of the flip cover.

9. The charging device according to claim 1, further comprising: a damping rotating shaft in the housing, wherein:
    the flip cover is pivotably coupled to the body through the damping rotating shaft, and
    the damping rotating shaft is configured to provide a damping force to maintain a relative position between the flip cover and the body after the flip cover rotates relative to the body.

10. The charging device according to claim 8, further comprising: a third charging circuitry located on the body, wherein:
    the third charging circuitry is configured to charge a second electronic device on a surface of the body.

11. The charging device according to claim 1, further comprising: a circuit board, wherein the circuit board is electrically connected to the charging circuitry and the power interface to transmit power supplied by the external power supply to the charging circuitry.

12. The charging device according to claim 1, further comprising:
    a power supply, wherein the power supply is provided inside the housing and is configured to supply power to the charging circuitry.

13. The charging device according to claim 1, wherein the movable board is configured to be extendable or retractable relative to the cavity.

14. A charging device comprising:
    a body having an exterior surface and an interior space;

a movable board comprising a first charging circuitry, the movable board being movable coupled to the body so that the first charging circuity is movable between a first position wherein the first charging circuitry is located in the interior space of the body and a second position wherein the first charging circuitry extends from the body and is exposed for charging an electronic device positioned on the movable board;

a flip cover comprising a second charging circuitry, the flip cover being pivotably connected to the body; and a third charging circuitry located on the exterior surface of the body.

15. The charging device according to claim 14, further comprising:

a spring connected to the movable board and the body, wherein the spring is configured to drive the movable board to extend relative to the body.

16. The charging device according to claim 15, further comprising:

a limit rod, wherein:

one end of the limit rod is fixed to the body, the limit rod is threaded through the movable board, and the spring is sleeved around an outer periphery of the limit rod.

17. The charging device according to claim 14, wherein:

the first charging circuitry is configured to charge a first electronic device, the second charging circuitry is configured to charge a second electronic device; and the third charging circuitry is configured to charge a third electronic device.

18. The charging device according to claim 14, further comprising: a damping rotating shaft, wherein:

the flip cover is pivotably provided on the body through the damping rotating shaft, and the damping rotating shaft is configured to provide a damping force to maintain a relative position between the flip cover and the body after the flip cover rotates relative to the body.

19. The charging device according to claim 14, wherein the movable board is connected to the body via a spring.

20. A charging device comprising:

a housing comprising a cavity, a body, and a flip cover, wherein the flip cover is pivotably coupled to the body via a rotating shaft;

a movable board, wherein the movable board is configured to be extendable or retractable relative to the cavity;

a first charging circuitry on the movable board;

a second charging circuitry on the flip cover; and a third charging circuitry on the body.

* * * * *